June 4, 1968     A. F. PHIPPS     3,386,653

CHECK NUMBER EVALUATING DEVICE

Filed April 8, 1966     2 Sheets-Sheet 1

INVENTOR
ARTHUR F. PHIPPS

BY Louis A. Kline
Elmer Wargo

HIS ATTORNEYS

June 4, 1968  A. F. PHIPPS  3,386,653
CHECK NUMBER EVALUATING DEVICE
Filed April 8, 1966  2 Sheets-Sheet 2

INVENTOR
ARTHUR F. PHIPPS
BY *Louis A. Kline*
*Elmer J. Vargo*
HIS ATTORNEYS

3,386,653
CHECK NUMBER EVALUATING DEVICE

Arthur F. Phipps, Potters Bar, England, assignor to The National Cash Register Company, Dayton, Ohio, a corporation of Maryland
Filed Apr. 8, 1966, Ser. No. 541,198
Claims priority, application Great Britain, Dec. 17, 1965, 53,611/65
13 Claims. (Cl. 235—61)

This invention relates to a check-number-evaluating device.

In the keyboard-operated computing machine art, it is frequently desired to have a number entered in the keyboard of a machine checked for its correctness before the number is processed in the machine. Such checking may be particularly desirable where the number to be set up is an account number, since, for example, in retail accounting, the checking of the accuracy of entry of an account number in automatic billing is a considerable aid in reducing the risk of billing an item to the wrong customer.

In order to enable such checking to be effected, it is known to insure that a number to be entered in the keyboard of a computing machine satisfies a predetermined mathematical rule. Such a number can be utilized in a known type of keyboard-operated computing machine which, within a few milliseconds after completion of entry of the number in the machine, checks whether the number actually entered conforms with the mathematical rule; if non-conformity is found, the machine prevents processing of the number in the machine and gives an indication that an error has been made in entering the number in the keyboard.

A given arbitrary number can be converted into a number satisfying a certain mathematical rule by adding a check number as an additional digit or digits at the end of the given number. Thus, for example, account numbers which all satisfy a certain mathematical rule can be formed from existing serially consecutive account numbers by adding to each existing account number a check number which is selected to be of such a value that the requirements of the mathematical rules are met.

A known checking technique using check numbers involves arranging that a check number $x$ for use with a given multi-digit number satisfies the mathematical rule:

$$x + \sum_{i=1}^{i=n} DiWi \equiv 0 \bmod p$$

where $n$ is the number of digits in the given number, $Di$ is the value of the $i$th digit of the given number, and $Wi$ is a weighting factor assigned to the $i$th digit. This mathematical expression is interpreted to mean that the sum of the check number and the products of the individual digits of the given number multiplied by their respective weighting factors is divisible by the modulus $p$ with 0 remainder.

It will be appreciated that the evaluation of a check number which satisfies the above mathematical expression is not an exercise that can be readily accomplished by mental arithmetic, particularly where the given number has more than two or three digits, and frequently time-wasting written calculations have to be made in evaluating such check numbers.

It is accordingly an object of the present invention to provide a simple, hand-operated device by means of which check numbers satisfying the above mathematical expression can be easily and rapidly evaluated.

According to the invention, there is provided a check-number-evaluating device adapted to evaluate a check number $x$ for use with any given multi-digit number having up to a predetermined number $m$ of digits such that the check number satisfies the mathematical rule:

$$x + \sum_{i=1}^{i=n} DiWi \equiv 0 \bmod p$$

where $n$ is the number of digits in the given number, $n$ being $\leq m$, $Di$ is the value of the $i$th digit of the given number, and $Wi$ is a weighting factor assigned to the $i$th digit.

The device comprises a casing having a plurality of slides which are slidably mounted therein and which slides respectively correspond to the weighting factors which may be used in evaluating the check number. Each slide has marked thereon a first series of integers 1 to 9 arranged in succession along the direction of sliding movement of the slide and also has marked thereon a second series of integers which are respectively related to the integers of said first series and which are also arranged in succession along the direction of sliding movement of the slide.

The integers of said second series satisfy the mathematical rule:

$$AiW + Bi \equiv 0 \bmod p$$

where $Ai$ is the $i$th integer of said first series, W is the weighting factor corresponding to the slide, and $Bi$ is the $i$th integer of said second series.

The casing has formed therein a series of slots respectively associated with the slides and a series of windows also respectively associated with the slides. The said first series of integers of each slide appear through the respective slot when the slide is in a predetermined rest position, and the arrangement is such that, upon actuation of the slide by moving it to a position in which a selected integer of said first series is adjacent a reference point on the casing, the related integer of said second series appears in the respective window.

The device further comprises a mod $p$ counter which includes a dialling member rotatably mounted on the casing. A portion of the surface of the dialling member is masked by the casing and has marked on it at least one series of integers 0 to $(p-1)$, which are arranged at equal intervals around the axis of rotation of the dialling member. The casing is provided with a window which is associated with the dialling member and which is so positioned that, with the counter set to any selected count, there appears in said window an appropriate one of the integers marked on said portion corresponding to the selected count. The counter also includes means whereby a number may be dialled into the counter by rotating the dialling member in a predetermined sense through a selected angular distance representative of the number dialled, the dialling of a number in the counter serving to increment the count of the counter by an amount corresponding to the number dialled.

It should be understood that by a "mod $p$ counter" is meant a counting device which upon reaching a count $(p-1)$ reverts to count zero at the next count. It should be further understood that the same weighting factor may be assigned to two or more digits of the given number, so that two or more slides of a device in accordance with the invention may correspond to the same weighting factor.

It will be appreciated that an appropriate check number for a given multi-digit number can be readily evaluated by a device according to the invention by first actuating those slides corresponding to the weighting factors to be used in evaluating the check number. Each of these slides is actuated by being slid to a position relative to the casing such that that integer of said first series corresponding to the value of the relevant digit of the given number is adjacent the appropriate reference point on the casing. After the slides are set, the mod $p$ counter is set to count 0 by rotating the dialling member until the integer 0 appears in the associated window, and then the integers appearing in those windows associated with the slides which have been actuated are successively dialled into the counter. The integer finally appearing in the associated window is the required check number. It should be appreciated that a device in accordance with the invention can also be used for checking the correctness of a number which already includes a check number.

A number of embodiments of the present invention will now be described by way of example with reference to the accompanying drawings, in which.

Figure 1:
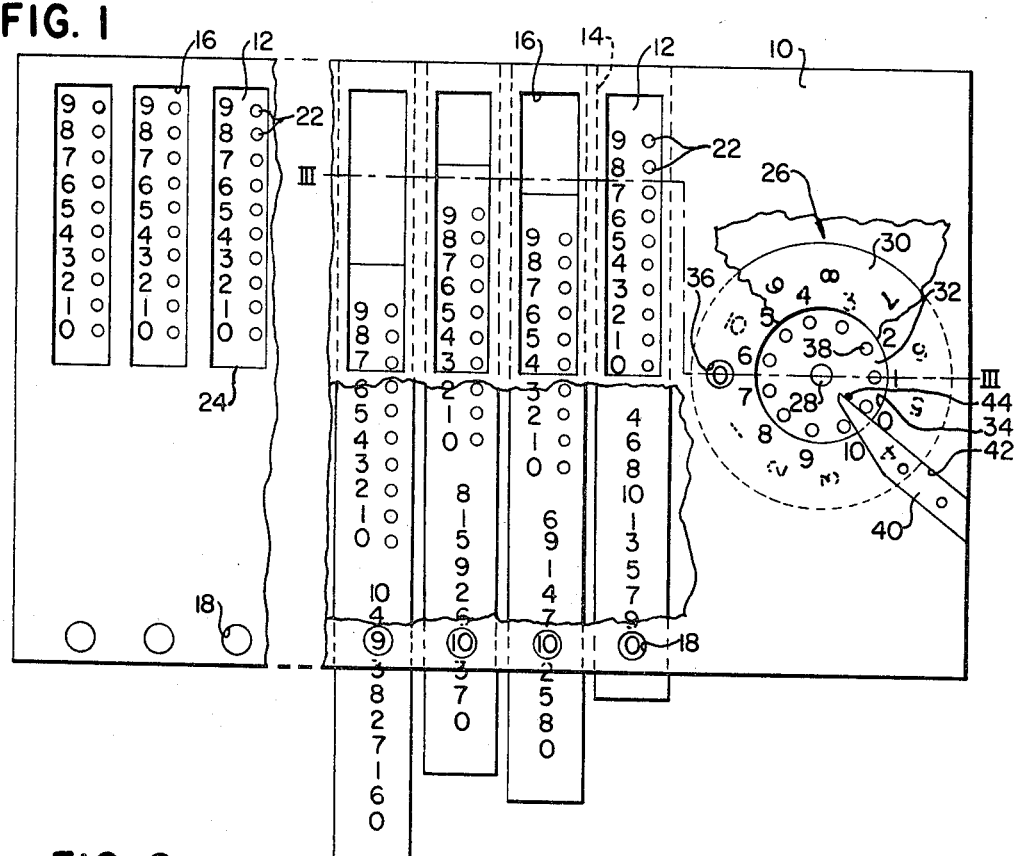
FIG. 1 is a plan view of the check-number-determining device of this invention, showing certain of the slides in an actuated position and also showing the counter.
Figure 2:
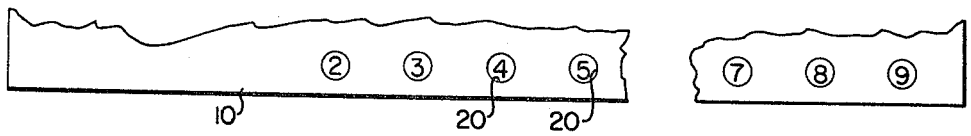
FIG. 2 is a plan view of a portion of the rear of the device shown in FIG. 1; however, all the slides are in their rest positions, in which the weighting factor for each slide appears through windows of the casing.
Figure 3:
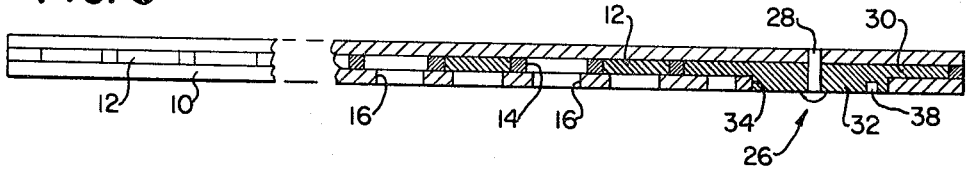
FIG. 3 is a sectional view of the device taken along the lines III—III of FIG. 1 and shows the mounting of the slides and the counter in the casing.

Referring to FIGS. 1 to 3, the check-number-evaluating device illustrated therein is adapted to operate with modulus 11, and the device is sufficiently small to enable it to be readily carried in a pocket. The device incorporates a flat rectangular casing 10, in which are slidably mounted eight flat elongated slides 12, of rectangular cross-section (only seven of which are shown), each slide 12 being slidably mounted in a respective open-ended slot 14, which extends over the whole height of the casing 10. The slides 12 respectively correspond to eight different weighting factors, the slides 12 from right to left with reference to FIG. 1 (from left to right with reference to FIG. 2) respectively corresponding to the weighting factors 2, 3, 4, 5, 6, 7, 8, and 9. However, it should be understood that the slides 12 are interchangeable one with another, so that the order of the slides 12 may be changed as desired.

The front face of the upper part (with reference to FIG. 1) of each slide 12 is marked with a first series of integers 0 to 9, arranged in succession along the direction of sliding movement of the slide 12 (that is, along the direction along which the slide 12 may be moved relative to the casing 10) as shown, while the front face of the lower part of each slide 12 is marked with a second series of integers, which also are arranged in succession along the direction of sliding movement of the slide and which are respectively related to the first series of integers. Thus, the uppermost integer of the first series of integers of each slide 12 is related to the uppermost integer of the second series of the slide 12, the second-from-top integer of the first series is related to the second-from-top integer of the second series, and so on.

The integers forming the second series of integers of each slide 12 are chosen to satisfy the mathematical rule $A_iW + B_i \equiv 0 \bmod 11$, where $A_i$ is the $i$th integer of the first series, W is the weighting factor corresponding to the slide, and $B_i$ is the $i$th integer of the second series. Thus, for example, considering the slide 12 corresponding to the weighting factor 2, that integer of the second series of the slide 12 relating to the integer 5 of the first series is the integer 1. The integers forming the second series of each of the slides 12 corresponding to weighting factors 2, 3, 4, and 5 are shown in FIG. 1.

The front surface of the casing 10 is provided with eight closed-ended rectangular slots 16, which are respectively associated with the slides 12 and which are slightly narrower than the slots 14; each slot 16 extends along most of the upper half of, and opens into, the relevant one of the slots 14. The front surface of the casing 10 is also provided with eight small windows 18, which are respectively associated with the slides 12, each window 18 being formed by a small circular hole which opens into the relevant slot 14. The rear surface of the casing 10 is provided with eight further small windows 20 (see FIG. 2).

In each slide 12 are formed a series of ten small circular actuating holes 22, which are respectively disposed alongside the integers 0 to 9 of the first series. When a slide 12 is in its rest position, in which the lower end of the slide 12 is in register with the lower edge of the casing 10, all the integers 0 to 9 and all the actuating holes 22 are visible through the respective slot 16, as illustrated for the three left-hand slides in FIG. 1, which are all in their rest positions. Also, when a slide 12 is in its rest position, an integer which is marked on the rear face of the slide 12 adjacent its lower end and which corresponds to the relevant weighting factor appears in the relevant window 20; thus, when all the slides 12 are in their rest positions, as shown in FIG. 2, integers indicative of the weighting factors corresponding to the slides 12 respectively appear in all the windows 20.

The actuating holes 22 (FIG. 1) provide a means whereby a selected slide 12 can be actuated by being moved downwardly from its rest position a predetermined amount relative to the casing 10. Each slide 12 can be actuated by inserting one end of a suitable actuating pin (not shown) into a selected hole 22 and moving the pin and the slide 12 downwardly, as viewed in FIG. 1, until the pin engages a stop 24, formed by the lower bounding edge of the respective slot 16. The dispositions of the holes 22 and the window 18 associated with each slide 12 are such that, when the slide 12 is actuated as aforesaid, there appears in the window 18 that one of the second series of integers relating to that one of the first series of integers alongside the actuating hole 22 which has been brought into juxtaposition with the stop 24. Thus, for example, with those slides 12 respectively corresponding to the weighting factors 2, 3, 4, and 5 actuated as shown in FIG. 1—that is to say, actuated so that the actuating holes 22 of these four slides 12 respectively corresponding to the integers 0, 4, 3, and 7 are in juxtaposition with the relevant stops 24—the integers 0, 10, 10, and 9 respectively appear in the windows 18 associated with the slides 12. Following the actuation of some or all of the slides 12, the actuated slides 12 can all be automatically returned to their rest positions by simply bringing the lower edge of the casing 10 into contact with a flat surface, the actuated slides 12 being thereby moved into the casing 10 until their lower edges are agains in register with the lower edge of the casing 10.

It should be understood that, in a modification of the device shown in FIG. 1, each slide 12 could be so designed that, when it is in its rest position, with its lower end in register with the lower edge of the casing 10, the integer 0 appears in the relevant window 18. It will be appreciated that, in this case, there is no necessity to mark the integer 0 (or provide the corresponding actuating hole 22) in the upper half of the slide 12, since the integer 0 will automatically be displayed in the window 18 when the slide 12 is in its rest position.

In addition to the slides 12, the device includes a mod 11 counter, which comprises a disc-like dialling member 26 rotatably mounted on the casing 10, the member 26 being rotatable about a pin 28 secured to the casing 10. The dialling member 26 comprises an outer annular portion 30, which is thinner than the remainder of the member 26 and which is masked by the casing 10, and a circular central portion 32, which is rotatably mounted in a circular opening 34 formed in the front surface of the casing 10. On the front face of the portion 30 are marked the integers 0 to 10 arranged in order at equal angular intervals in a counter-clockwise direction about the axis of rotation of the dialling member 26.

A window 36 is formed in the front surface of the casing 10 in association with the dialling member 26, the window 36 being in the form of a circular hole through which a part of the outer portion 30 of the member 26 is visible. The dispositions of the window 36 and of the integers 0 to 10 marked on the portion 30 are such that, during a 360-degree rotation of the dialling member 26, each of the integers 0 to 10 appears in turn in the window 36. The mod 11 counter is so designed that, when the counter is set to a particular count, a corresponding integer appears in the window 36; for example, when the counter is set to count 0, the integer 0 appears in the window 36 (as shown in FIG. 1).

Eleven dialling holes 38 are provided in the central circular portion 32 of the dialling member 26, the holes 38 being arranged in a circular array and being arranged at equal intervals about the pin 28. The front surface of the casing 10 is marked with a series of reference integers 0 to 10 arranged in order in a counter-clockwise direction at equal intervals around the periphery of the circular aperture 34. The dispositions of the reference integers are such that, when the counter is set to a count—that is to say, when an integer appears in the window 36—the dialling holes 38 are respectively disposed adjacent the reference integers.

A stop arm 40, having a stop surface 42, is secured to the front surface of the casing 10 in such a position (FIG. 1) that the stop surface 42 is adjacent the reference integer 0 and partially overlaps the inner portion 32 of the dialling member 26. A reference mark 44, in the form of a black spot, is marked on the front surface of the portion 32 adjacent one of the dialling holes 38, the arrangement being such that, when the mod 11 counter is in count 0 (that is to say, when the integer 0 appears in the window 36), that dialling hole 38 adjacent the mark 44 is also adjacent the stop surface 42 (as illustrated in FIG. 1). It should be understood that any integer from 1 to 10 can be dialled into the mod 11 counter by inserting one end of the actuating pin (not shown) into that dialling hole 38 adjacent the reference number corresponding to the integer to be dialled and rotating the dialling member 26 clockwise until the pin engages the stop surface 42. There will then appear in the window 36 an integer representing the sum mod 11 of the integer just dialled and the integer appearing in the window 36 immediately prior to the dialling operation; for example, if the integer just dialled is "8" and the integer appearing in the window 36 immediately prior to the dialling operation is "7," then the integer appearing in the window 36 at the end of the dialling operation is "4." It will be appreciated that it is not essential to have the reference numeral 0 marked on the portion 32, since no dialling of an integer 0 is ever involved.

In a modification of the device shown in FIG. 1, more than one series of integers 0 to 10 could be marked on the annular portion 30 in the same circular array, the last integer 10 of one series being followed by the first integer 0 of the next series, and so on. In this case, the array of dialling holes 38 would extend around only a part of the periphery of the portion 32, this array extending over an arc corresponding to eleven successive integers of the two or more series of integers marked on the portion 30.

The manner in which the device illustrated in FIGS. 1 to 3 is operated in order to evaluate an appropriate check number for a given mulit-digit number (having up to eight digits) will now be described. It will be assumed that, with respect to the given number, the units digit has assigned to it the weighting factor 2, the tens digit has assigned to it the weighting factor 3, the hundreds digit has assigned to it the weighting factor 4, and so on.

First, the slide 12 corresponding to the weighting factor 2 is actuated by inserting the actuating pin into the actuating hole 22 alongside that one of the first series of integers 0 to 9 corresponding to the value of the units digit of the given number and moving the pin against the relevant stop 24. Next, the slides 12 corresponding to the remaining digits of the given number are actuated in turn in a similar manner, each such slide 12 being actuated in accordance with the value of thte relevant digit of the given number. Thus, for example, if the givent number 7340 (which is the number corresponding to the settings of the slides 12 as shown in FIG. 1), the slide 12 corresponding to the weighting factor 2 is actuated by engaging the actuating pin in the actuating hole 22 alongside the integer 0, the slide 12 corresponding to the weighting factor 3 is actuated by engaging the actuating pin in the hole 22 alongside the integer 4, the slide 12 corresponding to the weighting factor 4 is actuated by engaging the actuating pin in the hole 22 alongside the integer 3, and the slide corresponding to the weighting factor 5 is actuated by engaging the actuating pin in the hole 22 alongside the integer 7. After the slides 12 have been actuated in the manner previously described, the integers, 9, 10, 10, and 0 respectively appear in the windows 18 associated with the actuated slides 12, as shown in FIG. 1.

Next, the integers appearing in the windows 18 (other than any integer 0) are dialled into the mod 11 counter dialling member 26 (FIG. 1). Before the dialling of these numbers takes place, the counter is first set to count 0 by engaging the actuating pin in the dialling hole 38 adjacent the reference mark 44 and rotating the dialling member 26 clockwise until the pin engages the stop surface 42. Following the completion of the dialling operations, the integer appearing in the window 36 is the required check number for the given number. Considering again the example where the given number is 7340, after the mod 11 counter has been set to count 0, the integer 9 is dialled in the counter, the integer then appearing in the window 36 being the integer 9; next, the integer 10 is dialled in the counter, the integer then appearing in the window 36 being the integer 8; and finally the integer 10 is again dialled in the counter, the integer then appearing in the window 36 being the integer 7. Thus, the integer 7 finally appearing in the window 36 is the required check number for the given number 7340.

Figure 5:
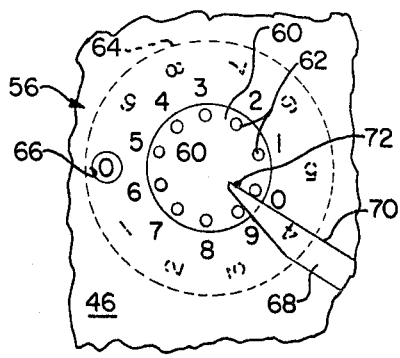
FIG. 5 is a plan view of the counter means employed with the second embodiment, shown in FIG. 4, and also employed in a third embodiment of this invention.
Figure 4:
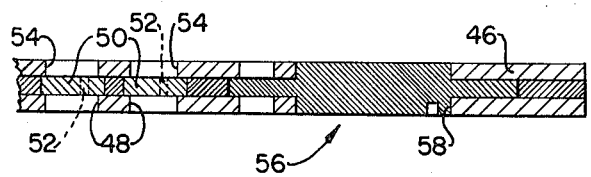
FIG. 4 is a sectional view of a second embodiment of the invention and is taken along lines similar to those of FIG. 3.

Referring now to FIGS. 4 and 5, a second embodiment of the invention will be described. The device corresponding to this embodiment is adapted to operate either with modulus 10 or with modulus 11 as desired. It should be understood that, except where stated otherwise, the device of the second embodiment is similar to the device shown in FIGS. 1 to 3.

Referring particularly to FIG. 4, the device of the second embodiment includes a casing 46, whose front surface (that is, the lower face, as shown in FIG. 4) is similar to the front surface of the casing 10 in FIG.1, being provided, for example, with slots 48 corresponding to the slots 16 shown in FIG. 1. The device also includes eight slides 50 (only two of which are shown in FIG. 4), which are similar to the slides 12 shown in FIG. 1 except that the rear faces of the slides 50 are also each marked with two series of integers, hereinafter respectively termed the third series and the fourth series; the fourth series of integers marked on each slide 50 is formed by the integers 0 to 9 marked on the upper half of the rear face of the slide 50 and arranged in succesesion along the direction of sliding movement of the slide 50 in the same manner as shown for the first series of integers marked on each of the slides 12 showin in FIG. 1. Each of the slides 50 is provided with a series of actuating holes 52, which correspond to the actuating holes 22 shown in FIG. 1 and which extend right through the slides 50, the arrangement being such that corresponding integers on the front and rear faces of the upper half of the slide 50 are associated with same actuating hole 52. The integers forming the third series of integers of each slide 50 are also marked in succession along the direction of sliding movement of the slide 50 and are respectively related to the integers of the fourth series. The integers forming the third series of integers marked on each slide 50 are chosen to satisfy the mathematical rule:

$$AiW + Ci \equiv 0 \bmod q$$

where $Ai$ is the $i$th integer of the fourth series (which series is the same as the first series marked on each of the slides 12 shown in FIG. 1), W is the weighting factor corresponding to the slide 50, and $Ci$ is the $i$th integer of the third series. Thus, for example, in regard to the clide 50 corresponding to the weighting factor 2, the third series is formed by the integers 0, 8, 6, 4, 2, 0, 8, 6, 4, and 2, these integers respectively relating to the integers 0 to 9 of the fourth series.

The rear surface of the casing 46 is provided with a series of eight slots 54, which are respectively dispersed opposite the slots 48, and with a series of eight windows (not seen in FIG. 4), which are respectively associated with the slides 50 and which serve a purpose similar to that of the windows 18 shown in FIG. 1. The arrangement is such that, when a selected slide 50 is actuated by inserting the actuating pin in that actuating hole 52 alongside a selected one of the fourth series of integers and moving the pin until the pin engages the relevant stop, there appears in the relevant window that integer of the third series which corresponds to the selected integer of the fourth series. It should be understood that, in the device in accordance with the second embodiment, windows serving the same purpose as the windows 20 shown in FIG. 2 could be provided adjacent the upper edge of the casing 46 in either main face thereof; in this case, the slides 50 could have marked on them further integers which represent the weighting factors corresponding to the slides 50 and which appear in these windows when the slides 50 are in their rest positions.

The device of the second embodiment includes a special form of dialling member 56, which serves as a dialling member for both a mod 11 counter and a mod 10 counter, the dialling member 56 (FIG. 4) being rotatably mounted in a cavity 58, formed in the casing 46. The mod 10 counter operates in exactly the same manner as the mod 11 counter incorporated in the device of FIGS. 1 to 3, the front portion of the member 56 (that is, the lower face of the member 56, as shown in FIG. 4), corresponding to the dialling member 26 shown in FIG. 1.

Referring now particularly to FIG. 5, there is illustrated therein the mod 10 counter of the second embodiment, which counter is formed by the rear face of the dialling member 56 and the associated part of the rear surface of the casing 46. As shown in FIG. 5, the central circular portion 60 of the rear surface of the dialling member 56 is provided with ten dialling holes 62 arranged at equal intervals around the axis of rotation of the member 56. The outer annular portion 64 of this surface of the member 56 is masked by the rear surface of the casing 46 and is marked with a series of integers 0 to 9 arranged in order at equal angular intervals in a counter-clockwise direction around the portion 64. The rear surface of the casing 46 is provided with a window 66, and the arrangement is such that, with the mod 10 counter set to a count, there appears in the window 66 an integer corresponding to this count.

The rear face of the casing 46 is marked with a series of reference integers 0 to 9 arranged in order at equal intervals in a counter-clockwise direction around the periphery of the portion 64, the disposition of these reference integers being such that, when the mod 10 counter is set to a count, the dialling holes 62 are respectively adjacent these reference integers.

A stop arm 68, having a stop surface 70, is secured to the rear surface of the casing 46 in such a position that the stop surface 70 is adjacent the reference integer 0 marked on this rear surface and partially overlaps the portion 60. A reference mark 72, in the form of a black spot, is marked on the surface of the portion 60 adjacent one of the dialling holes 62, the arrangement being such that, when the mod 10 counter is set to count 0, that dialling hole 62 adjacent the mark 72 is adjacent the stop surface 70, as illustrated in FIG. 5. It should be understood that any integer from 1 to 9 can be dialled into the mod 10 counter by inserting one end of the actuating pin in that dialling hole 62 adjacent the reference number corresponding to the integer to be dialled and rotating the dialling member clockwise (with reference to FIG. 5) until the pin engages the stop surface 70. There will then appear in the window 66 an integer representing the sum mod 10 of the integer just dialled and the integer appearing in the window 66 immediately prior to the dialling operating; for example, if the integer just dialled is "8" and the integer appearing in the window 66 immediately prior to the dialling operation is "7", then the integer finally appearing in the window 66 is "5".

The operation of the device of the second embodiment when operated with modulus 11 is exactly the same as previously described with reference to the device of FIGS. 1 to 3. When the device is operated with modulus 10, then the mod 10 counter and the rear faces of the slides 50 are used, the various operational steps being similar to those described with reference to FIGS. 1 to 3. Thus, when the device is operating with modulus 10, the slides 50 are actuated in accordance with the digits of the given number, and the integers then appearing in the relevant windows in the rear face of the casing 46 are dialled in turn into the mod 10 counter (this counter having first been set to count 0), the integer finally appearing in the window 66 being the required check number. Assuming, for example, that the given number is again 7340, after the slides 50 have been actuated in accordance with the values of the digits of this given number, the integers 5, 8, 8, and 0, respectively, appear in the relevant windows in the rear face of the casing 46. The integers 5, 8, and 8 are then dialled in turn into the mod 10 counter, and at the end of the dialling operations the integer 1 appears in the window 66, this integer being the required check number.

Figure 6:
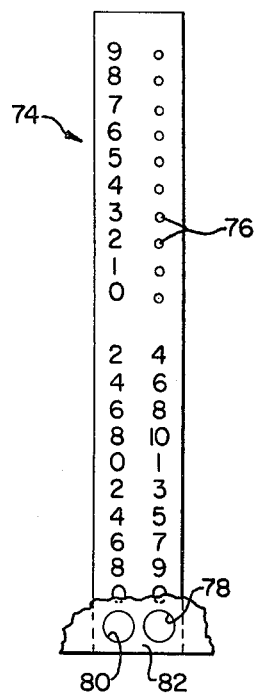
FIG. 6 is a front elevational view of one of the slides and a portion of the casing of a third embodiment of the invention.

Finally, a third embodiment of the invention will be briefly described with reference to FIG. 6, the device according to this embodiment again being adapted to operate either with modulus 10 or modulus 11 as desired. Again, except where stated otherwise, the device of the third embodiment is similar to the device illustrated in FIGS. 1 to 3. The basic difference between this third embodiment and the second embodiment described with reference to FIGS. 4 and 5 resides in the form of slides used, a typical slide 74 (corresponding to weighting factor 2) used in the third embodiment, illustrated in FIG. 6.

Considering the slide 74, all the series of integers marked on the slide 74 are marked on the front face thereof. These series include a first series of integers 0 to 9, which are marked in succession along the top half of the slide 74 and alongside which are respectively provided actuating holes 76, a second series of integers marked in succession below the actuating holes 76, and a third series of integers marked in succession below the first series. The second series of integers corresponds to the second series of the corresponding slide 12 shown in FIG. 1, while the third series corresponds to the third series marked on the rear face of the corresponding slide 50 of the arrangement illustrated in FIG. 4. The slide 74 is associated with a pair of windows 78 and 80, formed in the front surface of the casing 82 of the device, the window 78 being associated with the second series of integers and the window 80 being associated with the third series. The arrangement is such that, when the slide 74 is actuated by engaging the actuating pin in the dialling hole 76 alongside a selected integer of the first series and sliding the slide 74 downwardly until the pin engages the relevant stop, there appears in the window 78 that one of the second series which is related to the selected integer of the first series, while there appears in the window 80 that integer of the third series which is related to the selected integer of the first series.

The device according to the third embodiment includes a mod 11 counter and a mod 10 counter identical with the counters incorporated in the second embodiment.

In the operation of the device according to the third embodiment, the slides such as the slide 74 are actuated according to the values of the digits of a given number in the same manner as previously described with respect to the slides of the first and second embodiments. If the device is operating with modulus 11, the integers appearing in the right-hand ones of the pairs (corresponding to the window 78) of windows such as the windows 78, 80 are read off, while, if the device is operating with modulus 10, the integers appearing in the left-hand ones (corresponding to the window 80) of the pairs of windows such as the windows 78, 80 are read off. The integers thus read off are dialled in turn into the appropriate one of the counters in order to obtain the required check number.

What is claimed is:

1. A check-number-evaluating device adapted to evaluate a check number $x$ for use with any given multidigit number having up to a predetermined number $m$ of of digits such that the check number satisfies the mathematical rule:

$$x + \sum_{i=1}^{i=n} DiWi \equiv 0 \bmod p$$

where $n$ is the number of digits in the given number, $n$ being $\leq m$, $Di$ is the value of the $i$th digit of the given number, and $Wi$ is a weighting factor assigned to the $i$th digit, said device comprising a casing, a plurality of slides which are slidably mounted in said casing and which respectively correspond to the weighting factors which may be used in evaluating the check number, each said slide having marked thereon a first series of integers 1 to 9 arranged in succession along the direction of sliding movement of the slide and having marked thereon a second series of integers which are respectively related to the integers of said first series and which are also arranged in succession along the direction of sliding movement of the slide, the integers of said second series satisfying the mathematical rule:

$$AiW + Bi \equiv 0 \bmod p$$

where $Ai$ is the $i$th integer of said first series, W is the weighting factor corresponding to the slide, and $Bi$ is the $i$th integer of said second series, said casing having formed therein a series of slots respectively associated with said slides and a series of windows respectively associated with said slides, said first series of integers of each slide appearing through the respective slot when the slide is in a predetermined rest position, said device having a reference point for each said slide so that when a selected integer of said first series is adjacent the respective said reference point, the related integer of said second series will appear in the respective said window, said device further comprising a mod $p$ counter having a dialling member rotatably mounted in said casing, said dialling member having a portion of the surface thereof marked with at least one series of integers 0 to $(p-1)$ arranged at equally spaced intervals around the axis of rotation of said dialling member, said portion of the surface of said dialling member being masked by said casing, which is further provided with a window which is associated with said dialling member and which is positioned in said casing so that when said counter is set to any selected count, there appears in said last-named window an appropriate one of said integers on said portion of said dialling member corresponding to the selected count, said counter further comprising means whereby a number may be dialled in said counter by rotating said dialling member in a predetermined direction for a preselected angular rotation which is representative of the number dialled, the dialling of the number in said counter serving to increment the count therein by an amount corresponding to the number dialled.

2. The device as claimed in claim 1 in which each said slide has formed therein a series of holes which are respectively arranged adjacent to the integers 1 to 9 of said first series of integers and which said holes appear through the relevant slot in said casing when said slide is in said predetermined rest position, said holes being adapted to receive an actuating pin, and said device being such that when said actuating pin is inserted into the said hole adjacent to the selected integer, and said pin and slide are moved to align said pin with said reference point, the related integer of said second series will appear in the respective said window pertaining to the slide moved.

3. The device as claimed in claim 2 in which said slides are identical in size and are interchangeable in said slots of said casing, each said slide being marked with an integer representing the weighting factor to which the slide corresponds, said reference point for each said slot being coincident with one side of the slot.

4. A device as claimed in claim 3 in which said casing has at least one straight edge, said slides being arranged in said casing so that corresponding ends of said slides are in registration with said straight edge when said slides are each in said predetermined rest position, and said corresponding ends being moved out of said casing beyond said straight edge upon being actuated.

5. The device as claimed in claim 2 in which said dialling member has an array of dialling holes formed thereon, with said array extending at least partly around the axis of rotation of the dialling member, said casing having a fixed dialling stop for said dialling member, said casing being marked with a series of reference integers 1 to $(p-1)$ in positions such that when said mod $p$ counter is set to a count, said reference integers are respectively disposed adjacent to a corresponding number of said dialling holes while another one of said dialling holes is disposed adjacent to said dialling stop, said device being such that, with the said counter set to a count, a selected number from 1 to $(p-1)$ may be dialled in said counter by inserting one end of said actuating pin in that said dialling hole which is adjacent to the said reference integer corresponding to the selected number, and rotating said dialling member in a predetermined direction until said actuating pin engages said dialling stop.

6. The device as claimed in claim 5 in which said dialling member has a reference mark thereon which is located adjacent to one of said dialling holes such that said counter can be automatically set to its zero count by inserting said actuating pin in said last-named hole and rotating said dialling member in said predetermined direction until said actuating pin engages said dialling stop.

7. The device as claimed in claim 1 in which said $p$ is chosen to be 11.

8. The device as claimed in claim 1 in which said device is also adapted to evaluate a check number $y$ which satisfies the mathematical rule:

$$y + \sum_{i=1}^{i=n} DiWi \equiv 0 \bmod q$$

where $q$ is different from $p$, and in which each said slide has marked thereon a third series of integers which are arranged in succession along the direction of sliding movement of said slide and which are respectively related to said integers of said first series, the integers of said third series satisfying the mathematical rule:

$$AiW + Ci \equiv 0 \bmod q$$

where $Ci$ is the $i$th integer of said third series, and said device being such that integer of said third series relating to a selected one of the associated integers 1 to 9 of said first series can be indicated by said device in a manner similar to that in which that integer of said second series relating to a selected one of said first series can be indicated, and the device further comprising a mod $q$ counter arranged to operate in a similar manner to said mod $p$ counter.

9. The device as claimed in claim 8 in which the integers forming said third series are respectively arranged alongside the integers of said second series, said casing also having a second window formed therein for each said slide, said device being such that upon actuating a slide by moving it to a position such that a selected integer of said first series is adjacent said reference point, the related integer of said third series will appear in said second window.

10. The device as claimed in claim 8 in which, in respect to each said slide, the integers forming said third series are formed on the side of said slide opposite to the side on which said first series and said second series are marked, each said slide also having a fourth series of integers 1 to 9 on the same side as said third series and both said third and fourth series of integers being arranged in succession along the direction of sliding movement of the slide, said casing having a second reference point for each said slide and a second plurality of slots and a second series of windows respectively associated with said slides, the arrangement thereof being such that upon actuating a slide by moving it to a position such that a selected integer of said fourth series is adjacent the respective said second reference point, the related integer of said third series will appear in the respective window of said second series of windows.

11. The device as claimed in claim 8 in which said portion of said dialling member has a reverse side from the side on which said series of integers 0 to $(p-1)$ is marked, said reverse side having marked thereon at least one series of integers 0 to $(q-1)$ arranged at equal intervals around the axis of rotation of said dialling member, said casing also having another window therein associated with said reverse side of said dialling member so that with said mod $q$ counter set to any selected count, there appears in said last-named window an apropriate one of the integers marked on said reverse side corresponding to the selected count.

12. The device as claimed in claim 11 in which said dialling member has a second array of dialling holes formed on said reverse side extending at least partly around the axis of rotation of said dialling member, a second dialling stop fixed to said casing for said mod $q$ counter, said casing having marked thereon a series of reference integers 1 to $(q-1)$ in positions such that, when the mod $q$ counter is set to a count, these last-named integers are respectively disposed adjacent to a corresponding number of holes of said second array while another one of said last-named holes is disposed adjacent to said second dialling stop.

13. The device as claimed in claim 12 in which $p$ is chosen to be 11 and q is shown to be 10.

References Cited

UNITED STATES PATENTS

| | | | |
|---|---|---|---|
| 2,684,200 | 7/1954 | Starreveld et al. | 235—61 |
| 2,950,048 | 8/1960 | Luhn | 235—61 |
| 3,166,243 | 1/1965 | Torre | 235—61 |

STEPHEN J. TOMSKY, *Primary Examiner.*